United States Patent
Shah et al.

(10) Patent No.: US 9,110,965 B1
(45) Date of Patent: Aug. 18, 2015

(54) SYSTEMS AND METHODS FOR DISASTER RECOVERY FROM BINARY LARGE OBJECTS

(71) Applicant: Symantec Corporation, Mountain View, CA (US)

(72) Inventors: Kushal Shah, Santa Clara, CA (US); Makarand Chatur, Aundh (IN); Manav Deshmukh, Cupertino, CA (US); Jahangir Ahmad, Baner (IN)

(73) Assignee: Symantec Corporation, Mountain View, CA (US)

( * ) Notice: Subject to any disclaimer, the term of this patent is extended or adjusted under 35 U.S.C. 154(b) by 246 days.

(21) Appl. No.: 13/786,865

(22) Filed: Mar. 6, 2013

(51) Int. Cl.
*G06F 11/00* (2006.01)
*G06F 17/30* (2006.01)
*G06F 11/14* (2006.01)

(52) U.S. Cl.
CPC ...... *G06F 17/30575* (2013.01); *G06F 11/1412* (2013.01)

(58) Field of Classification Search
CPC .......... G06F 17/3048; G06F 17/30091; G06F 17/30233
USPC ............................ 709/225; 711/206; 714/4.11
See application file for complete search history.

(56) References Cited

U.S. PATENT DOCUMENTS

| | | | |
|---|---|---|---|
| 5,991,542 A * | 11/1999 | Han et al. | 717/167 |
| 6,477,583 B1 * | 11/2002 | Zayas et al. | 709/248 |
| 6,978,282 B1 * | 12/2005 | Dings et al. | 707/610 |
| 8,103,625 B1 * | 1/2012 | Pandit | 707/610 |
| 8,612,710 B2 * | 12/2013 | Hanson et al. | 711/163 |
| 2003/0005120 A1 * | 1/2003 | Mutalik et al. | 709/225 |
| 2003/0033327 A1 * | 2/2003 | Mandal et al. | 707/204 |
| 2006/0230076 A1 * | 10/2006 | Gounares et al. | 707/200 |
| 2007/0106706 A1 * | 5/2007 | Ahrens et al. | 707/202 |
| 2010/0199042 A1 * | 8/2010 | Bates et al. | 711/114 |
| 2012/0016840 A1 * | 1/2012 | Lin et al. | 707/626 |
| 2012/0072393 A1 * | 3/2012 | Kumar et al. | 707/634 |
| 2012/0173919 A1 * | 7/2012 | Patel et al. | 714/4.11 |
| 2012/0197844 A1 * | 8/2012 | Wang et al. | 707/646 |
| 2013/0218828 A1 * | 8/2013 | Lingamneni | 707/602 |
| 2014/0068224 A1 * | 3/2014 | Fan et al. | 711/206 |

OTHER PUBLICATIONS

Santosh Kalekar et al.; Systems and Methods for File-Level Replication; U.S. Appl. No. 13/646,858, filed Oct. 8, 2012.

* cited by examiner

*Primary Examiner* — Bryce Bonzo
*Assistant Examiner* — Jeison C Arcos
(74) *Attorney, Agent, or Firm* — ALG Intellectual Property, LLC (57) ABSTRACT

A computer-implemented method for disaster recovery from binary large objects may include (1) identifying a volume of data to be protected, (2) identifying a binary large object storage system, (3) replicating the volume to the binary large object storage system by writing to a binary large object file on the binary large object storage system to be readable as a consumable virtual disk that may represent the volume and (4) mounting the consumable virtual disk directly from the binary large object file. Various other methods, systems, and computer-readable media are also disclosed.

18 Claims, 7 Drawing Sheets

SYSTEMS AND METHODS FOR DISASTER RECOVERY FROM BINARY LARGE OBJECTS

BACKGROUND

Many organizations rely upon data replication to improve the reliability, fault-tolerance, and/or accessibility of their applications and/or data. Data replication typically involves replicating data from a primary site or device (e.g., a production volume) to a secondary (e.g., backup and/or disaster recovery) site or device.

Business continuity and disaster recovery refers to the capability to restore normal (or near-normal) business operations, from a critical business application perspective, after the occurrence of a disaster that interrupts business operations. Business continuity and disaster recovery may require the ability to bring up mission-critical applications and the data these applications depend on and make them available to users as quickly as business requirements dictate.

Some organizations may use cloud computing platforms and/or services to supplement their information technology infrastructure. Unfortunately, traditional cloud computing platforms do not offer an efficient, integrated disaster recovery solution. For example, replication in preparation for disaster recovery in traditional cloud computing platforms may require multiple computing and storage steps to receive and prepare replicated data for disaster recovery scenarios.

Accordingly, the instant disclosure identifies and addresses a need for additional and improved systems and methods for disaster recovery from binary large objects.

SUMMARY

As will be described in greater detail below, the instant disclosure generally relates to systems and methods for disaster recovery from binary large objects by writing volume data directly to binary large objects in a virtual disk format, such that the binary large objects are immediately consumable as virtual disks in disaster recovery scenarios.

In one example, a computer-implemented method for disaster recovery from binary large objects may include (1) identifying a volume of data to be protected, (2) identifying a binary large object storage system, (3) replicating the volume to the binary large object storage system by writing to a binary large object file on the binary large object storage system to be readable as a consumable virtual disk that may represent the volume and (4) mounting the consumable virtual disk directly from the binary large object file.

In some examples, replicating the volume to the binary large object storage system may include (1) identifying a change in a property of the volume and (2) modifying the binary large object file to reflect the change in the property of the volume in the consumable virtual disk.

In one embodiment, the change in the property of the volume may include a change in a size of the volume and modifying the binary large object file may include changing a size of the binary large object file to reflect the size of the volume.

In one embodiment the binary large object storage system may be a part of a third-party cloud computing platform and mounting the consumable virtual disk directly from the binary large object file may include (1) instantiating a virtual machine on the third-party cloud computing platform from an image library on the third-party cloud computing platform that may include a solution stack and (2) mounting the consumable virtual disk for use by the virtual machine.

In one embodiment the volume of data may be located at a primary site, the binary large object storage system may be located at a secondary site, and mounting the consumable virtual disk directly from the binary large object file may include (1) identifying a failure at the primary site and (2) mounting the consumable virtual disk at the secondary site in response to the failure.

In one embodiment, the binary large object storage system may be a part of a third-party cloud computing platform and replicating the volume may include (1) determining that the volume uses a compression technique and (2) replicating data from the volume to a queue on the third-party cloud computing platform for decompression before writing the data to the binary large object file.

In one example, replicating the volume may include writing replicated data from the volume directly to the binary large object file without first writing the replicated data to an intermediate storage location.

In one embodiment, a system for implementing the above-described method may include (1) an identification module programmed to (i) identify a volume of data to be protected, and (ii) identify a binary large object storage system, (2) a replication module programmed to replicate the volume to the binary large object storage system by writing to a binary large object file on the binary large object storage system to be readable as a consumable virtual disk that may represent the volume, (3) a mounting module programmed to mount the consumable virtual disk directly from the binary large object file and (4) at least one processor configured to execute the identification module, the replication module and the mounting module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a volume of data to be protected, (2) identify a binary large object storage system, (3) replicate the volume to the binary large object storage system by writing to a binary large object file on the binary large object storage system to be readable as a consumable virtual disk that may represent the volume and (4) mount the consumable virtual disk directly from the binary large object file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for disaster recovery from binary large objects. As will be explained in greater detail below, by writing volume data directly to binary large objects in a virtual disk format, such that the binary large objects are immediately consumable as virtual disks in disaster recovery scenarios, the systems and methods described herein may conserve computing resources (e.g., by avoiding the intermediate storage and processing of replicated data before preparing the replicated data for use in disaster recovery). Additionally, in some examples these systems and methods may circumvent third-party limitations on virtual disks used on cloud computing platforms (e.g., by storing these virtual disks via data-agnostic binary large objects rather).

The following will provide, with reference to FIGS. 1, 2, 4, and 5, detailed descriptions of exemplary systems for disaster recovery from binary large objects. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
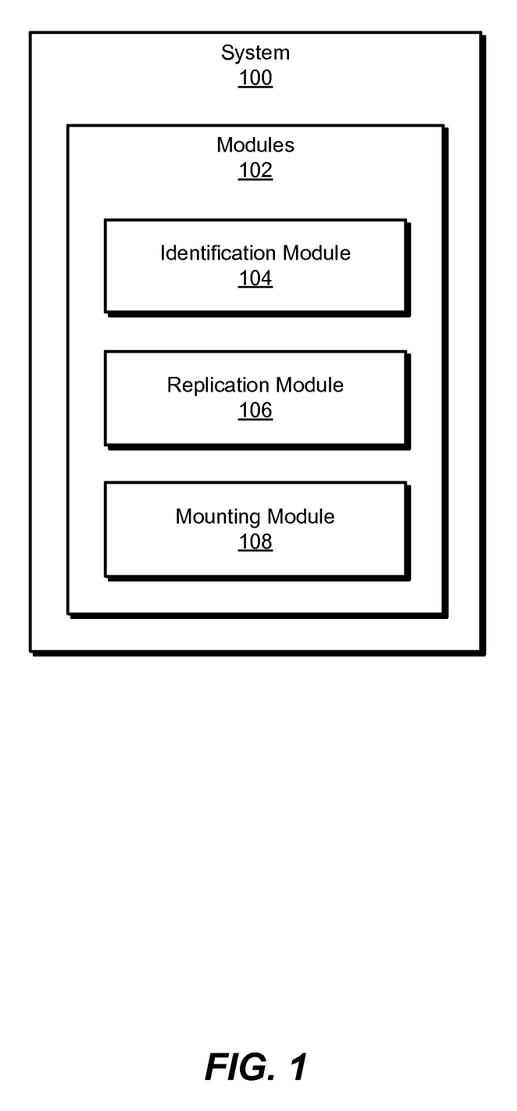
FIG. 1 is a block diagram of an exemplary system for disaster recovery from binary large objects.

FIG. 1 is a block diagram of exemplary system 100 for disaster recovery from binary large objects. As illustrated in this figure, exemplary system 100 may include one or more modules 102 for performing one or more tasks. For example, and as will be explained in greater detail below, exemplary system 100 may also include an identification module 104 programmed to identify a volume of data to be protected. Exemplary system 100 may additionally include a replication module 106 programmed to replicate the volume to the binary large object storage system by writing to a binary large object file on the binary large object storage system to be readable as a consumable virtual disk that represents the volume. Exemplary system 100 may also include a mounting module 108 programmed to mount the consumable virtual disk directly from the binary large object file.

Mounting module 108 may be further programmed to mount the consumable virtual disk directly from the binary large object file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or binary large object storage system 220), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
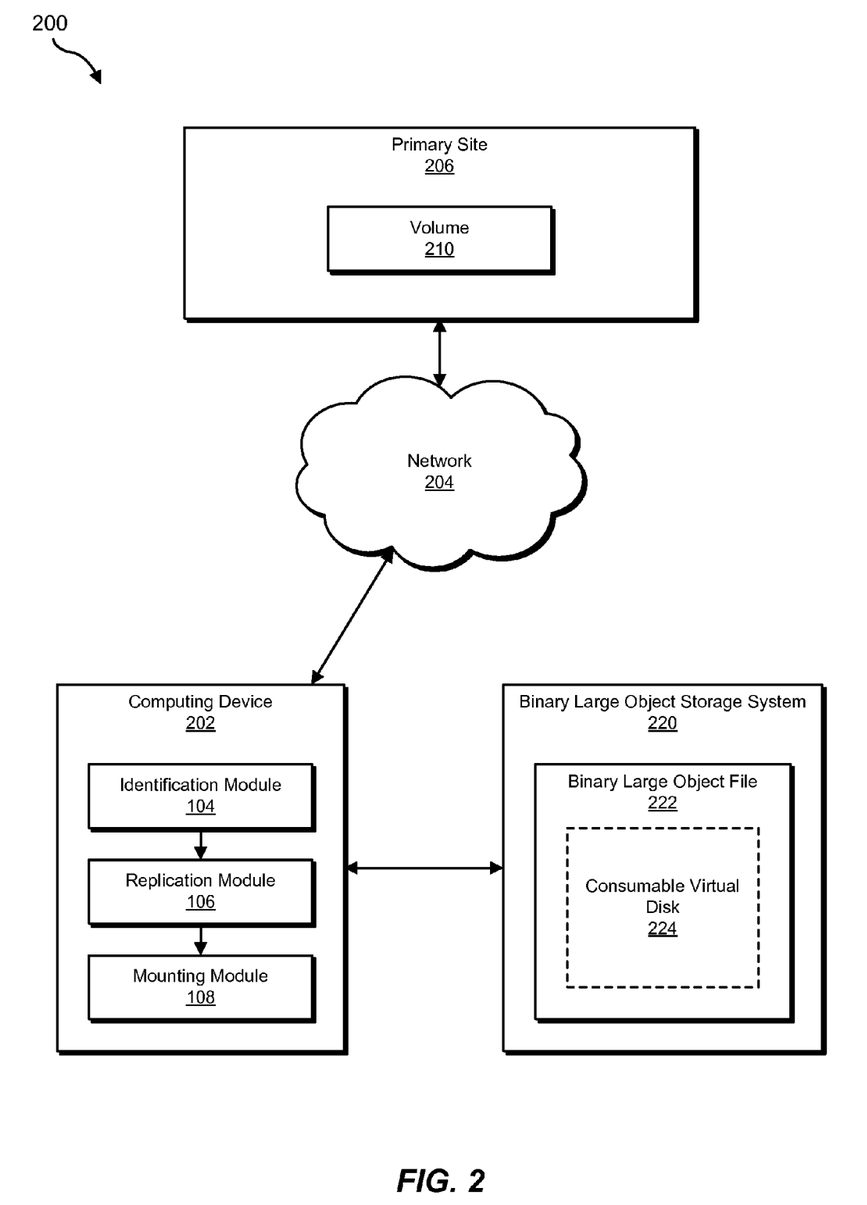
FIG. 2 is a block diagram of an exemplary system for disaster recovery from binary large objects.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a primary site 206 via a network 204. In one example, primary site 206 may replicate volume 210 to binary large object storage system 220). Computing device 202 may be programmed with one or more of modules 102. Additionally or alternatively, one or more computing devices at primary site 206 may be programmed with one or more of modules 102.

In one embodiment, one or more of modules 102 from FIG. 1 may, when executed by at least one processor of computing device 202 and/or primary site 206, facilitate computing device 202 and/or primary site 206 in disaster recovery from binary large objects. For example, and as will be described in greater detail below, one or more of modules 102 may cause computing device 202 and/or primary site 206 to prepare a binary large object file 222 in a consumable virtual disk format. disaster recovery from binary large objects. For example, and as will be described in greater detail below, identification module 104 may be programmed to identify a volume 210 of data to be protected. Identification module 104 may be programmed to identify a binary large object storage system 220. Replication module 106 may be programmed to replicate volume 210 to binary large object storage system 220 by writing to a binary large object file 222 on binary large object storage system 220 to be readable as a consumable virtual disk 224 that represents volume 210. Mounting module 108 may be programmed to mount consumable virtual disk 224 directly from binary large object file 222.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Primary site 206 may represent one or more computing devices capable of storing data and/or replicating data to another site. In some examples, primary site 206 may include one or more application servers and/or database servers configured to provide various database services and/or run certain software applications.

Binary large object storage system 220 may represent portions of a single database or storage device or a plurality of databases or storage devices. For example, binary large object storage system 220 may represent a portion of computing device 202 in FIG. 2, computing system 610 in FIG. 6, and/or portions of exemplary network architecture 700 in FIG. 7. Alternatively, binary large object storage system 220 in FIG. 2 may represent one or more physically separate devices capable of being accessed by a computing device, such as computing device 202 in FIG. 2, computing system 610 in FIG. 6, and/or portions of exemplary network architecture 700 in FIG. 7.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
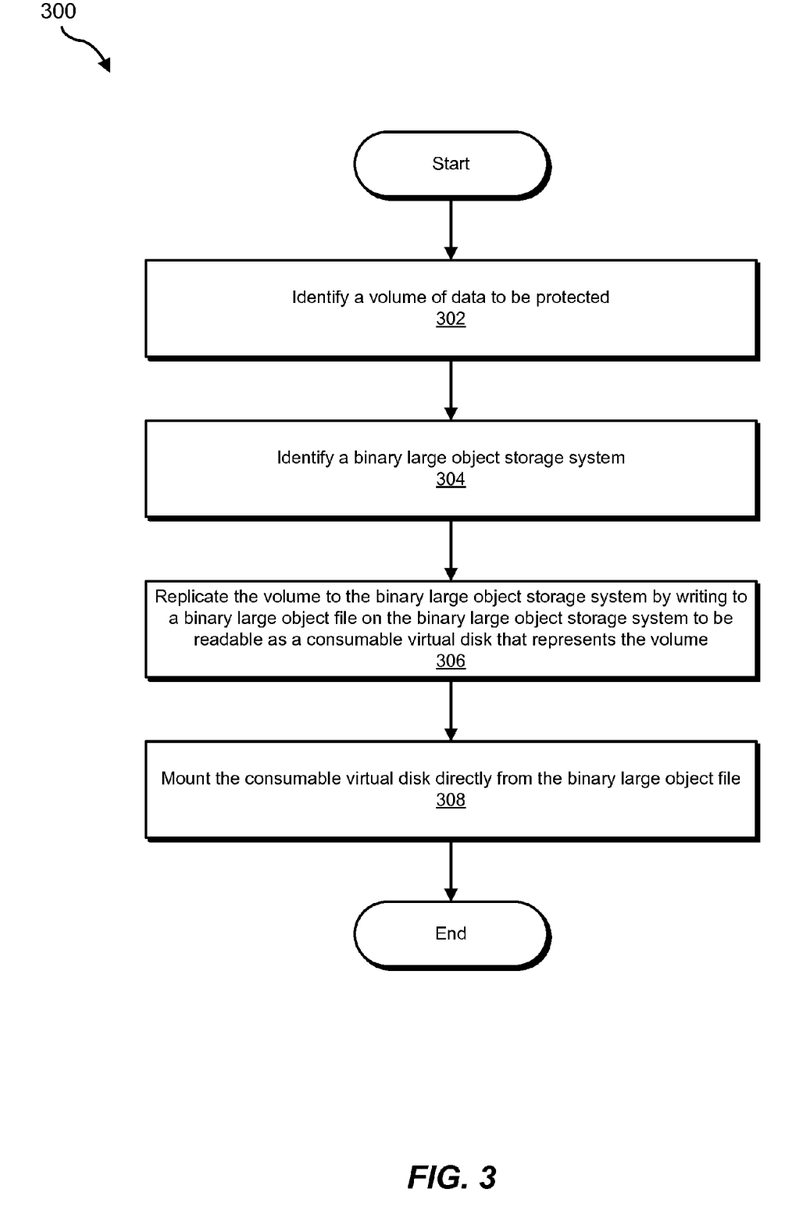
FIG. 3 is a flow diagram of an exemplary method for disaster recovery from binary large objects.

FIG. 3 is a flow diagram of an exemplary computer-implemented method 300 for disaster recovery from binary large objects. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a volume of data to be protected. For example, at step 302 identification module 104 may, as part of computing device 202 in FIG. 2, identify volume 210 to be protected.

As used herein, the term "volume" may refer to any distinctly identifiable collection of data. In some examples, the volume may correspond to a logical storage unit used by a file system to store one or more files. In some examples, the term "volume" may refer to an addressable storage space capable of storing files. By way of example, the term "volume" may refer to a volume managed by a logical volume manager such as LOGICAL DISK MANAGER or VERITAS VOLUME MANAGER. In some examples, the term "volume" may refer to a dynamic volume (e.g., a volume that may span across physical disks).

Identification module 104 may identify the volume in any suitable manner. For example, identification module 104 may identify a policy for replicating the volume. Additionally or alternatively, identification module 104 may identify replicated data originating from the volume. In some examples, identification module 104 may receive a message identifying the volume as subject to protection (e.g., replication).

Figure 4:
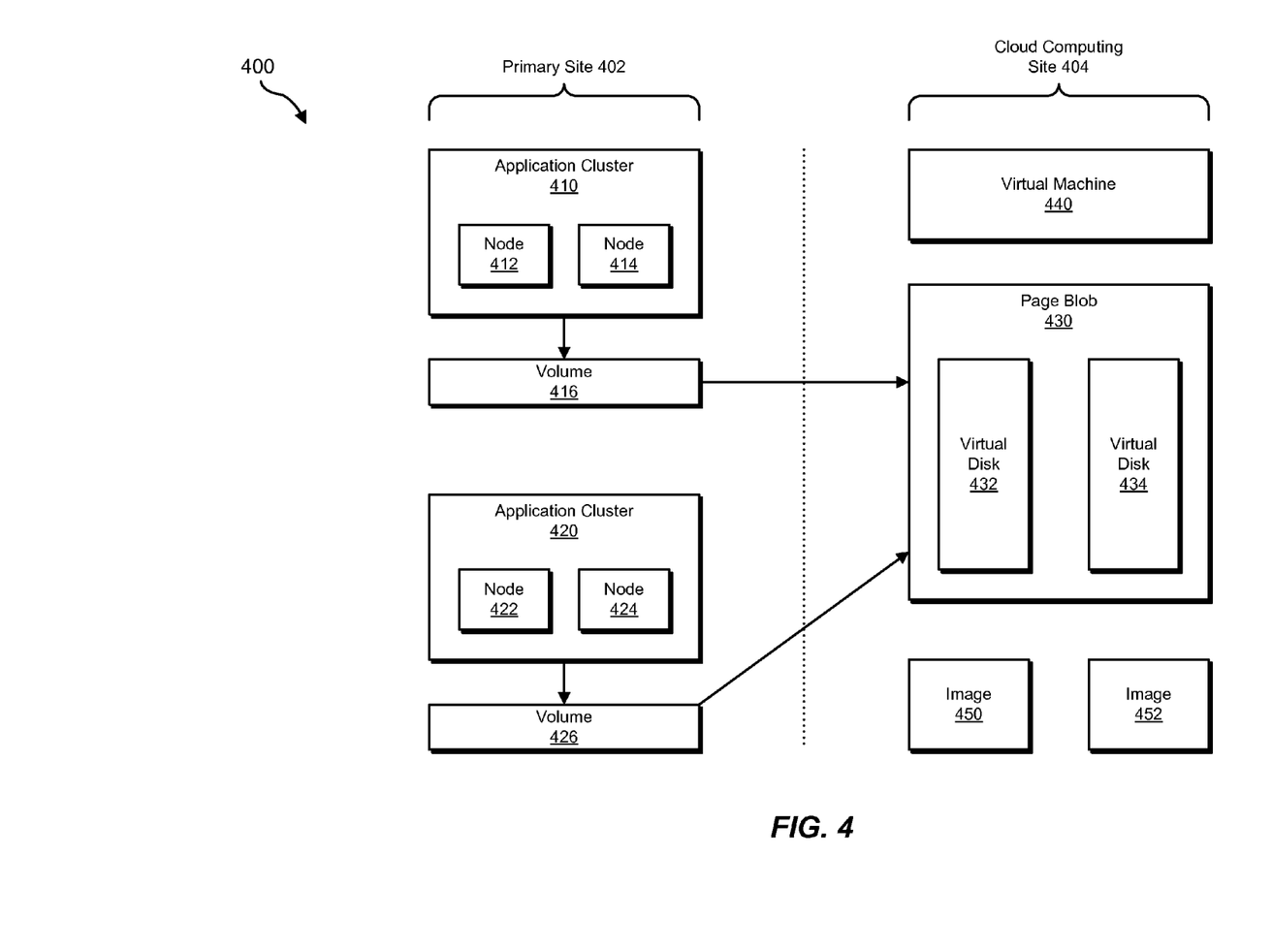
FIG. 4 is a block diagram of an exemplary system for disaster recovery from binary large objects.

FIG. 4 is a block diagram of an exemplary computing system 400. As shown in FIG. 4, exemplary computing system 400 may include a primary site 402 with an application cluster 410 (e.g., containing nodes 412 and 414) that stores data to a volume 416, and an application cluster 410 (e.g., containing nodes 422 and 424) that stores data to a volume 426. Computing system 400 may also include a cloud computing site 404 with a page blob 430 (e.g., a binary large object). Using FIG. 4 as an example, identification module 104 may, from primary site 402 and/or cloud computing site 404, identify volumes 416 and 426 to be protected.

Returning to FIG. 3, at step 304 one or more of the systems described herein may identify a binary large object storage system. For example, at step 304 identification module 104 may, as part of computing device 202 in FIG. 2, identify binary large object storage system 220.

As used herein, the phrase "binary large object" (or "blob") may refer to any collection of binary information. In some examples, the phrase "binary large object" may refer to a blob provided via a cloud computing platform, such as WINDOWS AZURE in WINDOWS AZURE BLOB STORAGE. In some examples, a blob may include a page blob (e.g., a binary large object divided into pages and designed for random access).

As used herein, the phrase "binary large object storage system" may refer to any system for storing binary large objects. In some examples, the binary large object storage system may include one or more underlying components of a cloud computing platform configured to provide blob storage as a service.

Identification module 104 may identify the binary large object storage system in any suitable manner. For example, identification module 104 may identify the binary large object storage system by identifying a cloud computing platform that provides blob storage with the binary large object storage system. Additionally or alternatively, identification module 104 may identify the binary large object storage system via an application programming interface of such a cloud computing platform. In some examples, identification module 104 may operate as a part of such a cloud computing platform and identify the binary large object storage system in response to a request for blob storage. Additionally or alternatively, identification module 104 may identify the binary large object storage system by identifying replicated data addressed to the binary large object storage system.

Returning to FIG. 3, at step 306 one or more of the systems described herein may replicate the volume to the binary large object storage system by writing to a binary large object file on the binary large object storage system to be readable as a consumable virtual disk that represents the volume. For example, at step 306 replication module 106 may, as part of computing device 202 in FIG. 2, replicate volume 210 to binary large object storage system 220 by writing to a binary large object file 222 on binary large object storage system 220 to be readable as consumable virtual disk 224 that represents volume 210.

As used herein, the term "replication" may refer to any scheme for maintaining an up-to-date copy of a collection of data. In some examples, one or more of the systems described herein may perform continuous replication. As used herein, the phrase "continuous replication" may refer to any service for providing continuous and/or real-time backup services (e.g., by replicating each transaction and/or operation synchronously and/or near-synchronously).

Replication module 106 may replicate the volume in any suitable manner. For example, replication module 106 may replicate the volume using VERITAS VOLUME REPLICATOR. Additionally or alternatively, replication module 106 may replicate the volume with file-based replication. In some examples, replication module 106 may replicate the volume by replicating differential data from a snapshot of the volume (e.g., based on a recovery-point-objective interval).

As used herein, the phrase "virtual disk file" may refer to any file and/or image containing data stored for the use of a virtual machine. In some examples, the data as stored within the virtual disk file may reflect the raw contents and/or structure of a virtual storage device or "virtual disk." Examples of virtual disk files include, without limitation, a VMWARE VIRTUAL MACHINE DISK file (a "VMDK file") and a VIRTUAL HARD DISK file (a "VHD file"). In some examples, replication module 106 may write to the binary large object file in a virtual disk file format (e.g., as a VHD file). As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

In some examples, replication module 106 may identify a change in a property of the volume and modify the binary large object file to reflect the change in the property of the volume in the consumable virtual disk. For example, replication module 106 may replicate volume metadata from the volume to the binary large object file. In some examples, replication module 106 may inspect a private region of the volume that stores metadata relating to the volume.

In some examples, the change in the property of the volume may include a change in the size of the volume. In these examples, replication module 106 may modify the binary large object file by changing a size of the binary large object file to reflect the size of the volume. For example, if the binary large object file is 80 gigabytes large, and the volume increases to 100 gigabytes in size, replication module 106 may increase the size of the binary large object file to accommodate the new size of the virtual disk representing the volume.

In some examples, the binary large object storage system may be a part of a third-party cloud computing platform (e.g., WINDOWS AZURE). In some examples, replication module 106 may determine that the volume uses a compression technique. In these examples, replication module 106 may replicate data from the volume to a queue on the third-party cloud computing platform for decompression before writing the data to the binary large object file. For example, replication module 106 may determine that the replicated data is encoded with a data compression algorithm and replicate the data to the queue to decompress the data. Additionally or alternatively, replication module 106 may determine that the replicated data is deduplicated and may replicate the data to the queue to restore the data from deduplication before writing the data to the binary large object file.

Using FIG. 4 as an example, replication module 106 may replicate volumes 416 and 426 to page blob 330 in the format of virtual disks (e.g., virtual disks 432 and 434, respectively). In this example, a virtual machine 440 at cloud computing site 440 may conduct a heartbeat between primary site 402 and cloud computing site 404.

Figure 5:
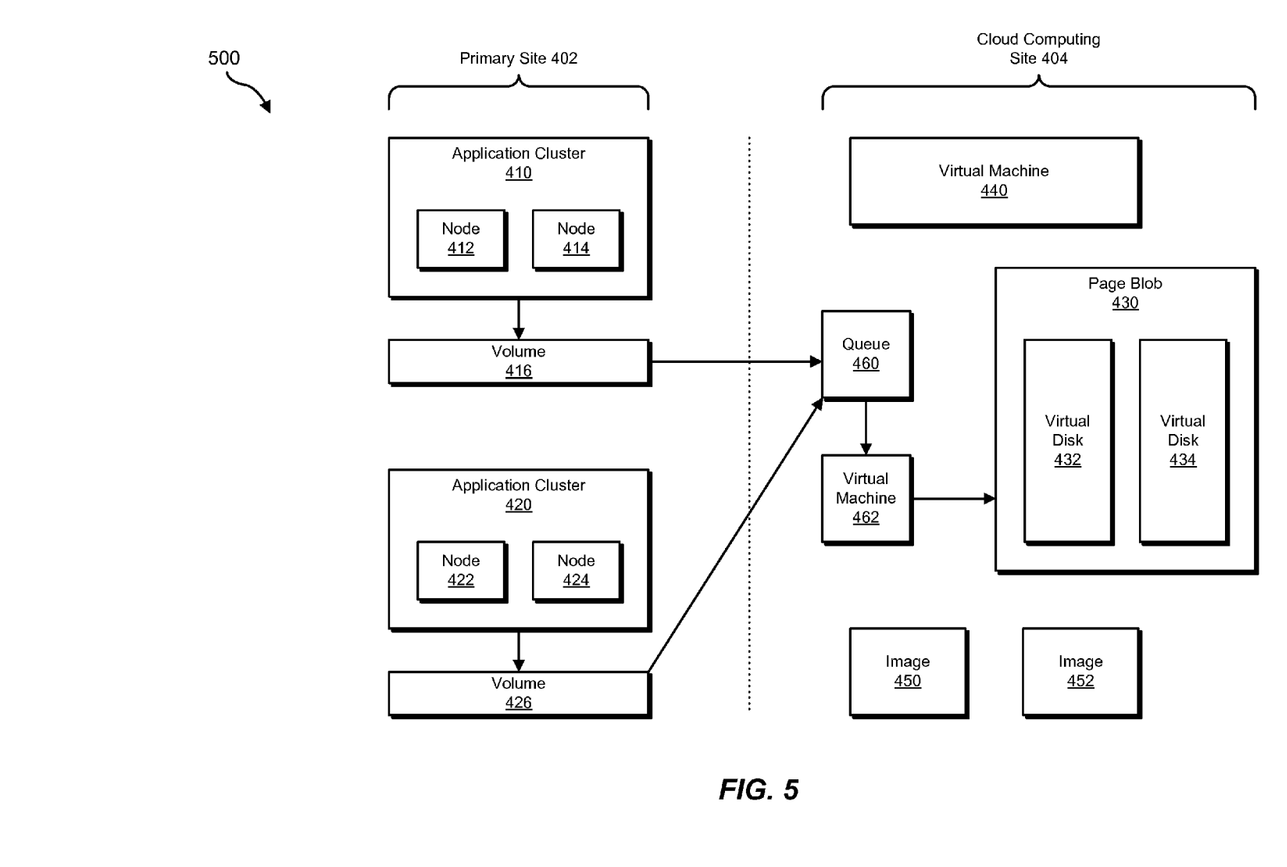
FIG. 5 is a block diagram of an exemplary system for disaster recovery from binary large objects.

FIG. 5 is a block diagram of an exemplary computing system 500. Using FIG. 5 as an example, replication module 106 may replicate volumes 416 and 426 to a queue 460 for processing (e.g., decompression). A virtual machine 462 may read and process replicated data from queue 460 and write the processed data, in correct order, to page blob 430. In this manner, replication module 106 may maintain data consistency and write order fidelity.

In some examples, replication module 106 may write replicated data from the volume directly to the binary large object file without first writing the replicated data to an intermediate storage location. By writing directly to the binary large object file, the systems and methods described herein may decrease the consumption of computing resources and increase the efficiency of replication.

Returning to FIG. 3, at step 308 one or more of the systems described herein may mount the consumable virtual disk directly from the binary large object file. For example, at step 308 mounting module 108 may, as part of computing device 202 in FIG. 2, mount consumable virtual disk 224 directly from binary large object file 222.

In some examples, the binary large object storage system may be a part of a third-party cloud computing platform (e.g., WINDOWS AZURE). In these examples, mounting the consumable virtual disk directly from the binary large object file may include (1) instantiating a virtual machine on the third-party cloud computing platform from an image library on the third-party cloud computing platform that may include a solution stack and (2) mounting the consumable virtual disk for use by the virtual machine. As used herein, the phrase "solution stack" may refer to a combination of an operating system and/or one or more applications. For example, the solution stack may provide the same functionality as a solution stack at the primary site where the volume resides that uses the volume for storage.

Using FIG. 4 as an example, at step 308 mounting module 108 may instantiate a virtual machine from an image 450 (e.g., that includes a solution stack functionally parallel to a solution stack used by application cluster 410) and mount virtual disk 432 for use by the virtual machine using image 450. Mounting module 10 may additionally instantiate a virtual machine from an image 452 and mount virtual disk 434 for use by the virtual machine using image 452.

In some examples, the volume of data may be located at a primary site and the binary large object storage system may be located at a secondary site (e.g., a cloud computing platform such as WINDOWS AZURE). In these examples, mounting the consumable virtual disk directly from the binary large object file may include (1) identifying a failure at the primary site and (2) mounting the consumable virtual disk at the secondary site in response to the failure. The systems described herein may thereby achieve a disaster recovery.

As explained above in connection with method 300 in FIG. 3, by writing volume data directly to binary large objects in a virtual disk format, such that the binary large objects are immediately consumable as virtual disks in disaster recovery scenarios, the systems and methods described herein may conserve computing resources (e.g., by avoiding the intermediate storage and processing of replicated data before preparing the replicated data for use in disaster recovery). Additionally, in some examples these systems and methods may circumvent third-party limitations on virtual disks used on cloud computing platforms (e.g., by storing these virtual disks via data-agnostic binary large objects rather).

Figure 6:
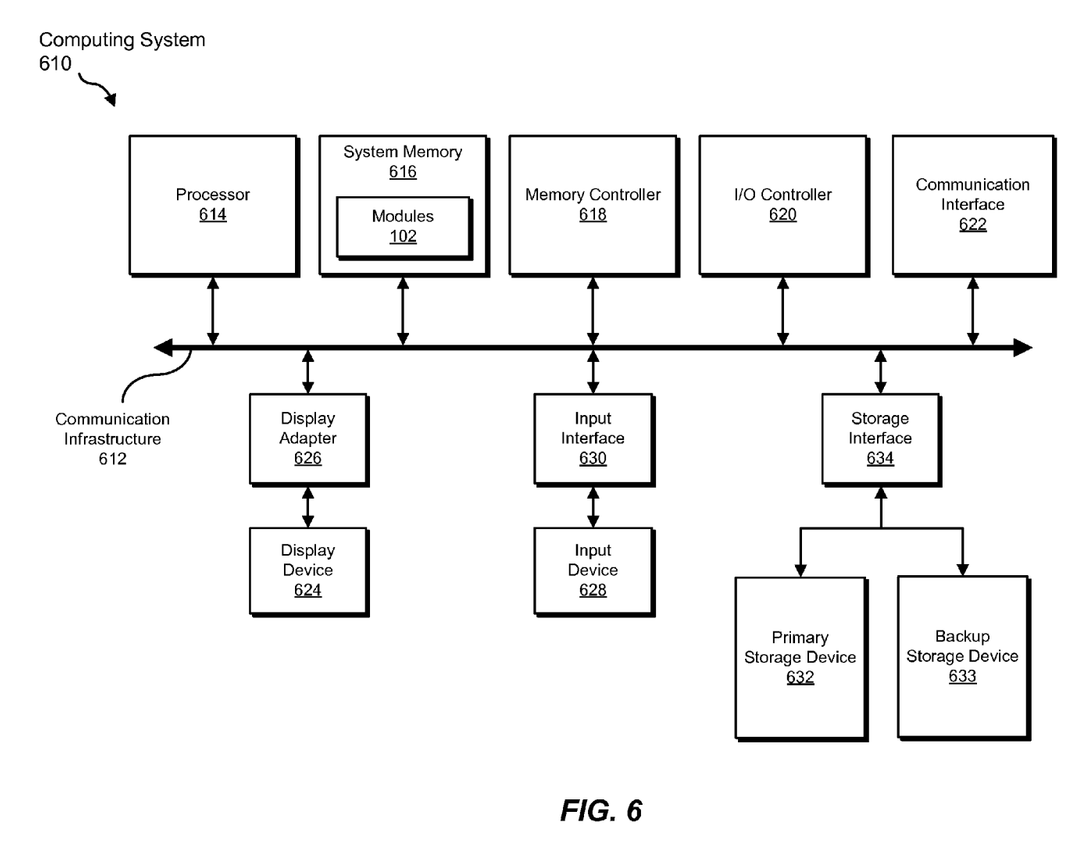
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, replicating, mounting, modifying, determining, and writing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
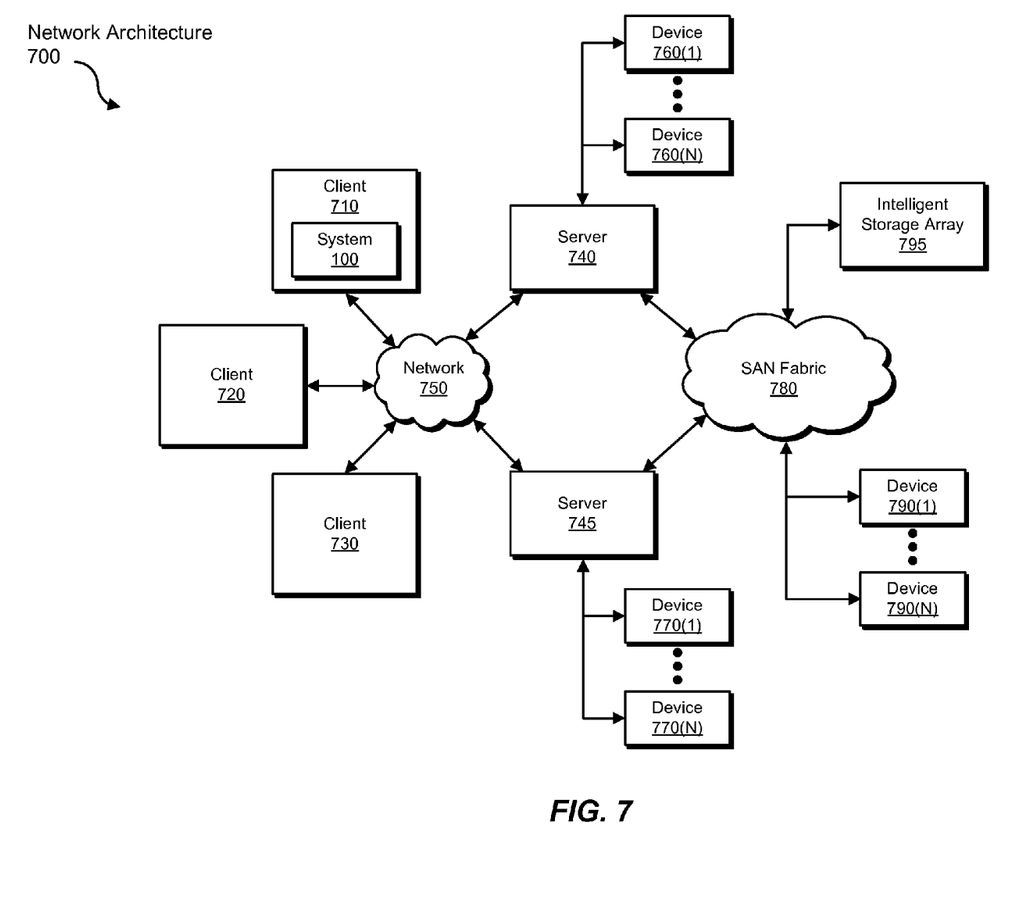
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, replicating, mounting, modifying, determining, and writing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for disaster recovery from binary large objects.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate a multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive replicated data to be transformed, transform the replicated data, output a result of the transformation to a binary large object file, use the result of the transformation to create and maintain a virtual disk replica of a volume, and store the result of the transformation to a third-party cloud computing platform. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for disaster recovery from binary large objects, at least a portion of the method being performed by a computing device comprising at least one processor, the method comprising:
    identifying a volume of data to be protected;
    identifying a binary large object storage system, wherein the binary large object storage system is a part of a third-party cloud computing platform;
    replicating the volume to the binary large object storage system by writing to a binary large object file on the binary large object storage system to be readable as a consumable virtual disk that represents the volume, wherein replicating the volume comprises determining that the volume uses a compression technique and replicating data from the volume to a queue on the third-party cloud computing platform for decompression before writing the data to the binary large object file;
    mounting the consumable virtual disk directly from the binary large object file.

2. The computer-implemented method of claim 1, wherein replicating the volume to the binary large object storage system comprises:
    identifying a change in a property of the volume;
    modifying the binary large object file to reflect the change in the property of the volume in the consumable virtual disk.

3. The computer-implemented method of claim 2, wherein:
    the change in the property of the volume comprises a change in a size of the volume;
    modifying the binary large object file comprises changing a size of the binary large object file to reflect the size of the volume.

4. The computer-implemented method of claim 1, wherein:
    mounting the consumable virtual disk directly from the binary large object file comprises:
    instantiating a virtual machine on the third-party cloud computing platform from an image library on the third-party cloud computing platform that comprises a solution stack;

mounting the consumable virtual disk for use by the virtual machine.

5. The computer-implemented method of claim 1, wherein:
the volume of data is located at a primary site;
the binary large object storage system is located at a secondary site;
mounting the consumable virtual disk directly from the binary large object file comprises:
identifying a failure at the primary site;
mounting the consumable virtual disk at the secondary site in response to the failure.

6. The computer-implemented method of claim 1, wherein replicating the volume to the binary large object storage system comprises writing replicated data from the volume directly to the binary large object file without first writing the replicated data to an intermediate storage location.

7. A system for disaster recovery from binary large objects, the system comprising:
an identification module programmed to:
identify a volume of data to be protected;
identify a binary large object storage system, wherein the binary large object storage system is a part of a third-party cloud computing platform;
a replication module programmed to replicate the volume to the binary large object storage system by writing to a binary large object file on the binary large object storage system to be readable as a consumable virtual disk that represents the volume, wherein replicating the volume comprises determining that the volume uses a compression technique and replicating data from the volume to a queue on the third-party cloud computing platform for decompression before writing the data to the binary large object file;
a mounting module programmed to mount the consumable virtual disk directly from the binary large object file;
at least one processor configured to execute the identification module, the replication module and the mounting module.

8. The system of claim 7, wherein the replication module is programmed to replicate the volume to the binary large object storage system by:
identifying a change in a property of the volume;
modifying the binary large object file to reflect the change in the property of the volume in the consumable virtual disk.

9. The system of claim 8, wherein:
the change in the property of the volume comprises a change in a size of the volume;
the replication module is programmed to modify the binary large object file by changing a size of the binary large object file to reflect the size of the volume.

10. The system of claim 7, wherein:
the mounting module is programmed to mount the consumable virtual disk directly from the binary large object file by:
instantiating a virtual machine on the third-party cloud computing platform from an image library on the third-party cloud computing platform that comprises a solution stack;
mounting the consumable virtual disk for use by the virtual machine.

11. The system of claim 7, wherein:
the volume of data is located at a primary site;
the binary large object storage system is located at a secondary site;

the mounting module is programmed to mount the consumable virtual disk directly from the binary large object file by:
identifying a failure at the primary site;
mounting the consumable virtual disk at the secondary site in response to the failure.

12. The system of claim 7, wherein the replication module is programmed to replicate the volume to the binary large object storage system by writing replicated data from the volume directly to the binary large object file without first writing the replicated data to an intermediate storage location.

13. A non-transitory computer-readable-storage medium comprising one or more computer-readable instructions that, when executed by at least one processor of a computing device, cause the computing device to:
identify a volume of data to be protected;
identify a binary large object storage system, wherein the binary large object storage system is a part of a third-party cloud computing platform;
replicate the volume to the binary large object storage system by writing to a binary large object file on the binary large object storage system to be readable as a consumable virtual disk that represents the volume, wherein replicating the volume comprises determining that the volume uses a compression technique and replicating data from the volume to a queue on the third-party cloud computing platform for decompression before writing the data to the binary large object file;
mount the consumable virtual disk directly from the binary large object file.

14. The non-transitory computer-readable-storage medium of claim 13, wherein replicating the volume to the binary large object storage system comprises:
identifying a change in a property of the volume;
modifying the binary large object file to reflect the change in the property of the volume in the consumable virtual disk.

15. The non-transitory computer-readable-storage medium of claim 14, wherein:
the change in the property of the volume comprises a change in a size of the volume;
modifying the binary large object file comprises changing a size of the binary large object file to reflect the size of the volume.

16. The non-transitory computer-readable-storage medium of claim 13, wherein:
mounting the consumable virtual disk directly from the binary large object file comprises:
instantiating a virtual machine on the third-party cloud computing platform from an image library on the third-party cloud computing platform that comprises a solution stack;
mounting the consumable virtual disk for use by the virtual machine.

17. The non-transitory computer-readable-storage medium of claim 13, wherein:
the volume of data is located at a primary site;
the binary large object storage system is located at a secondary site;
mounting the consumable virtual disk directly from the binary large object file comprises:
identifying a failure at the primary site;
mounting the consumable virtual disk at the secondary site in response to the failure.

18. The non-transitory computer-readable-storage medium of claim 13, wherein replicating the volume to the binary large object storage system comprises writing replicated data from the volume directly to the binary large object file without first writing the replicated data to an intermediate storage location.

* * * * *